(12) United States Patent
Riley

(10) Patent No.: US 11,078,649 B1
(45) Date of Patent: Aug. 3, 2021

(54) SYSTEMS FOR SELECTIVELY REPLENISHING AQUIFERS AND GENERATING ELECTRICAL POWER BASED ON ELECTRICAL DEMAND

(71) Applicant: William Riley, Captiva, FL (US)

(72) Inventor: William Riley, Captiva, FL (US)

(*) Notice: Subject to any disclaimer, the term of this patent is extended or adjusted under 35 U.S.C. 154(b) by 22 days.

(21) Appl. No.: 16/837,870

(22) Filed: Apr. 1, 2020

(51) Int. Cl.
| | |
|---|---|
| E03B 3/34 | (2006.01) |
| H02J 3/38 | (2006.01) |
| H02J 3/00 | (2006.01) |
| H02K 7/18 | (2006.01) |
| C02F 1/04 | (2006.01) |
| B01D 3/10 | (2006.01) |
| B01D 61/36 | (2006.01) |
| G05B 19/042 | (2006.01) |
| C02F 1/44 | (2006.01) |
| C02F 103/08 | (2006.01) |

(52) U.S. Cl.
CPC ............... *E03B 3/34* (2013.01); *B01D 3/103* (2013.01); *B01D 61/364* (2013.01); *C02F 1/046* (2013.01); *C02F 1/447* (2013.01); *G05B 19/042* (2013.01); *H02J 3/003* (2020.01); *H02J 3/004* (2020.01); *H02J 3/381* (2013.01); *H02K 7/1823* (2013.01); *C02F 2103/08* (2013.01); *C02F 2201/009* (2013.01); *G05B 2219/25252* (2013.01); *H02J 2300/22* (2020.01)

(58) Field of Classification Search
CPC ...... E03B 3/34; H02K 7/1823; H02J 2300/22; H02J 3/004; H02J 3/381; H02J 3/003; C02F 1/447; C02F 1/046; C02F 2201/009; C02F 2103/08; B01D 3/103; B01D 61/364; G05B 2219/25252; G05B 19/042

See application file for complete search history.

(56) References Cited

U.S. PATENT DOCUMENTS

| | | | | |
|---|---|---|---|---|
| 2008/0047326 A1* | 2/2008 | McCann | ............... | E03B 3/32 73/53.01 |
| 2014/0190691 A1* | 7/2014 | Vinegar | ............... | E21B 43/2401 166/272.1 |
| 2015/0143806 A1* | 5/2015 | Friesth | ............... | F03G 7/04 60/517 |
| 2018/0078872 A1* | 3/2018 | Riley | ............... | C02F 1/16 |

OTHER PUBLICATIONS

Wikipedia [online], "Pumped storage hydroelectricity", Retrieved from https://en.wikipedia.org/w/index.php?title=Pumped-storage_hydroelectricity&oldid=948227211, retrieved on Mar. 30, 2020 (11 pages).

* cited by examiner

*Primary Examiner* — Ziaul Karim
(74) *Attorney, Agent, or Firm* — Fish & Richardson P.C.

(57) ABSTRACT

In an example method, first electrical power is generated using one or more solar panels. Saline water is desalinated using a desalination facility powered, at least in part, by the first electrical power. The desalinated water is stored in a reservoir located at a first elevation. A usage of an electrical grid is monitored, and a determination is made that one or more criteria are satisfied at a first time. In response, the desalinated water is directed from the reservoir to a turbine generator located at a second elevation, second electrical power is generated using the turbine generator, the desalinated water is directed from the turbine generator into an aquifer located at a third elevation, and at least a portion of the second electrical power is provided to the electrical grid.

19 Claims, 10 Drawing Sheets

SYSTEMS FOR SELECTIVELY REPLENISHING AQUIFERS AND GENERATING ELECTRICAL POWER BASED ON ELECTRICAL DEMAND

TECHNICAL FIELD

This disclosure relates to systems for selectively replenishing aquifers and generating electrical power based on an electrical demand on an electrical grid.

BACKGROUND

Desalination is a process that removes minerals from saline water. As an example, desalination can remove salt and other minerals from ocean water, such that the water is more suitable for human consumption, agriculture, or other applications.

An aquifer is an underground layer of water-bearing permeable rock, rock fractures, and/or unconsolidated materials (e.g., gravel, sand, or silt) from which groundwater can be extracted. In some implementations, water can be extracted from an aquifer using a water well that extends from the earth's surface to the aquifer.

SUMMARY

In one aspect, the present disclosure describes a method that includes generating first electrical power using one or more solar panels; desalinating saline water using a desalination facility powered, at least in part, by the first electrical power; storing the desalinated water in a reservoir located at a first elevation; monitoring a usage of an electrical grid; determining, based on the usage of the electrical grid, that one or more criteria are satisfied at a first time; and responsive to determining that the one or more criteria are satisfied at the first time, performing several actions. The actions include directing the desalinated water from the reservoir to a turbine generator located at a second elevation, where the second elevation is lower than the first elevation; generating second electrical power using the turbine generator based, at least in part, on the desalinated water flowing through the turbine generator; directing the desalinated water from the turbine generator into an aquifer located at a third elevation, where the third elevation is lower than the second elevation; and providing at least a portion of the second electrical power to the electrical grid.

Implementations of this aspect can include one or more of the following features.

For example, in some implementations, monitoring the usage of the electrical grid can include determining a demand for electrical power on the electrical grid over a period of time, and determining a supply of electrical power on the electrical grid over the period of time. Determining that the one or more criteria are satisfied at the first time can include determining that the demand for electrical power on the electrical grid exceeds the supply of electrical power on the electrical grid at the first time.

In some implementations, monitoring the usage of the electrical grid can include determining a demand for electrical power on the electrical grid over a period of time, and determining a supply of electrical power on the electrical grid over the period of time. Determining that the one or more criteria are satisfied at the first time can include determining that a difference between the demand for electrical power on the electrical grid and the supply of electrical power on the electrical grid is less than a threshold level at the first time.

In some implementations, determining that the one or more criteria are satisfied at the first time can include estimating, based on historical data regarding the usage of the electrical grid that a peak demand on the electrical grid occurs at the first time.

In some implementations, monitoring the usage of the electrical grid can include determining a demand for electrical power on the electrical grid over a period of time, and determining a supply of electrical power on the electrical grid over the period of time. Determining that the one or more criteria are satisfied at the first time can include determining that that the demand for electrical power on the electrical grid did not exceed the supply of electrical power on the electrical grid during a time interval ending at the first time, and determining that the time interval exceeds a threshold length of time.

In some implementations, monitoring the usage of the electrical grid can include determining a supply of electrical power on the electrical grid over the period of time from one or more solar power generators. Determining that the one or more criteria are satisfied at the first time can include determining that that the supply of electrical power from the one or more solar power generators has decreased below a threshold level at the first time.

In some implementations, directing the desalinated water from the reservoir, to the turbine generator, and into the aquifer can include causing the desalinated water to flow from the reservoir, to the turbine generator, and into the aquifer without an aid of a pump.

In some implementations, the desalination facility can be predominantly powered by the first electrical power.

In some implementations, the desalination facility can be located at the first elevation.

In some implementations, the first elevation can be a surface of the earth.

In some implementations, the method can further include determining that the aquifer is at least partially depleted. The desalinated water can be directed from the reservoir to the turbine generator, after determining that the aquifer is at least partially depleted.

In another aspect, the present disclosure describes a system that includes one or more solar panels, a desalination facility, a reservoir located at a first elevation, a turbine generator located at a second elevation, and a control module having one or more processors. The second elevation is lower than the first elevation. The one or more solar panels are configured to generate first electrical power and provide the first electrical power to the desalination facility. The control module is operable to cause saline water to be desalinated using the first electrical power; cause the desalinated water to be directed to the reservoir; monitor a usage of an electrical grid; determine, based on the usage of the electrical grid, that one or more criteria are satisfied at a first time; and responsive to determining that the one or more criteria are satisfied at the first time, perform several actions. The actions include causing the desalinated water to flow from the reservoir to the turbine generator; causing second electrical power to be generated using the turbine generator based, at least in part, on the desalinated water flowing through the turbine generator; causing the desalinated water to flow from the turbine generator into an aquifer at a third elevation, where the third elevation is lower than the second elevation; and causing at least a portion of the second electrical power to be provided to the electrical grid.

Implementations of this aspect can include one or more of the following features.

For example, in some implementations, the control module can be operable to monitor the usage of the electrical grid by determining a demand for electrical power on the electrical grid over a period of time, and determining a supply of electrical power on the electrical grid over the period of time.

In some implementations, the control module can be operable to determine that the one or more criteria are satisfied at the first time by determining that the demand for electrical power on the electrical grid exceeds the supply of electrical power on the electrical grid at the first time.

In some implementations, the control module can be operable to determine that the one or more criteria are satisfied at the first time by determining that a difference between the demand for electrical power on the electrical grid and the supply of electrical power on the electrical grid is less than a threshold level at the first time.

In some implementations, the control module can be operable to determine that the one or more criteria are satisfied at the first time by estimating, based on historical data regarding the usage of the electrical grid, that a peak demand on the electrical grid occurs at the first time.

In some implementations, the control module can be operable to determine that the one or more criteria are satisfied at the first time by determining that that the demand for electrical power on the electrical grid did not exceed the supply of electrical power on the electrical grid during a time interval ending at the first time, and determining that the time interval exceeds a threshold length of time.

In some implementations, the control module can be operable to cause the desalinated water to flow from the reservoir, to the turbine generator, and into the aquifer by causing the desalinated water to flow from the reservoir, to the turbine generator, and into the aquifer without an aid of a pump. The control module can be operable to determine that the aquifer is at least partially depleted, and cause the desalinated water to flow from the reservoir to the turbine generator, after determining that the aquifer is at least partially depleted.

In some implementations, the desalination facility can be predominantly powered by the first electrical power.

In some implementations, the desalination facility can be located at the first elevation.

In some implementations, the first elevation can be a surface of the earth.

One or more of the implementations described herein can provide various technical benefits. For example, implementations of a system can be operable to desalinate saline water and replenish an aquifer using the desalinated water. Further, the system can be operable to generate electrical power during the replenishment process, and provide at least some of the generated power to an electrical grid (e.g., such that the electrical power can be distributed to others via the electrical grid). Further, the system can generate electrical power selectively at specific times to meet the electrical demand on the electrical grid (e.g., during times of peak demand and/or a lag in supply). In some implementations, the system can be powered predominantly or entirely by solar power generated by the electrical power generation system itself (e.g., such that the system is substantially self-sustaining with respect to electrical power).

The details of one or more embodiments are set forth in the accompanying drawings and the description below.

Other aspects, features and advantages will be apparent from the detailed description and accompanying drawings, and from the claims.

DETAILED DESCRIPTION

Figure 1A:
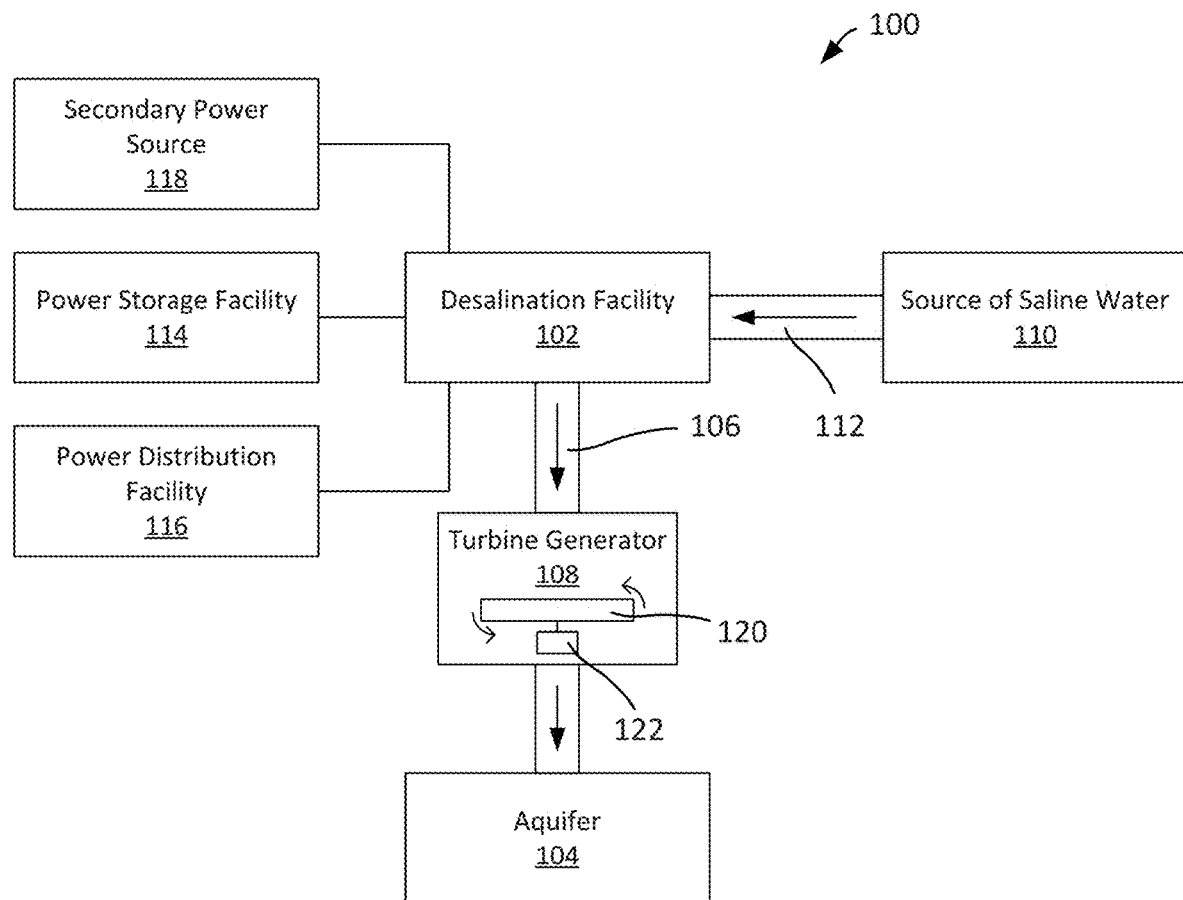
FIGS. 1A and 1B are diagrams of an example of an electrical power generation system.

This disclosure describes implementations of an electrical power generation system. Some implementations of the electrical power generation system are operable to remove or otherwise reduce the presence of salt and other minerals from water. In some implementations, water processed by the electrical power generation system is more suitable for use in a variety of applications (e.g., potable water for human consumption, irrigation water in support of agriculture, etc.).

In some implementations, an electrical power generation system can be configured to replenish aquifers. As an example, a naturally occurring aquifer may provide potable water to a neighboring population. However, as the amount of groundwater contained within the aquifer is limited, extraction of groundwater depletes the aquifer over time. To replenish the aquifer, implementations of the electrical power generation system can desalinate water from a naturally occurring source of saline water (e.g., a neighboring ocean or salt water bay), and direct the desalinated water into the aquifer. This can be useful, for example, as it improves the sustainability of the aquifer and/or extends the usable life of the aquifer. Further, this enables desalinated water to be stored in a natural underground formation, thereby reducing or eliminating the need to construct man-made water storage structures (e.g., water tanks or reservoirs). Further, as desalinated water is stored underground instead of on the surface, the surface footprint of the electrical power generation system is reduced, thereby enabling the development and utilization of land for other purposes. Further still, desalinated water that is stored underground is less likely to be lost through evaporation, thereby improving the efficiency of the overall system.

In some implementations, the electrical power generation system can generate electrical power by converting potential and/or kinetic energy associated with the desalinated water into electrical power. As an example, desalinated water can be directed to the aquifer through a conduit (e.g., a pipe, tube, or wellbore) extending from a desalination facility on or near the earth's surface to an underground aquifer. As the desalinated water flows downward under the influence of gravity, the water can be directed through one or more turbine generators located in the path of water flow. Energy from the flowing water can be converted into electrical power (e.g., through the rotation of a turbine or rotor assembly by the flowing water), and the electrical power can be relayed to the surface for distribution and/or use. In some implementations, some or all of the electrical power can be used to operate the electrical power generation system. In some implementations, some or all of the electrical power can be stored for future use and/or relayed to remote entities for use elsewhere.

In some implementations, the electrical power generation system can be powered partially or entirely by the electrical power generated on-site by the electrical power generation system. This can be useful, for example, as it enables the electrical power generation system to reduce and/or eliminate its consumption of electrical power from outside sources. In some implementations, electrical power generation system can be substantially self-sustaining with respect to electrical power. In some implementations, the electrical power generation system can be powered partially or entirely by electrical power obtained from alternative power sources, such as solar powered electric generators, wind powered electric generators, or hydroelectric generators. This can be useful, for example, as it enables the electrical power generation system to operate in a more environmentally conscious manner. In some implementations, the electrical power generation system can be powered by a combination of the electrical power generated on-site and electrical power obtained from alternative power sources.

In some implementations, an electrical power generation system selectively can generate electrical power at specific times to meet the electrical demand on the electrical grid. For example, the electrical power generation system can generate electrical power selectively during times of peak demand, while not generating power selectively during times of low demand.

An example electrical power generation system 100 is shown schematically in FIG. 1A. The electrical power generation system 100 includes a desalination facility 102 and an aquifer 104. The desalination facility 102 and the aquifer 104 are in fluid communication with one another via a conduit 106 extending between them. The system 100 also includes a turbine generator 108 located in the fluid conduit 106.

As shown in FIG. 1A, during operation of the electrical power generation system 100, the desalination facility 102 draws saline water from a source of saline water 110 (e.g., via a conduit 112 extending between them). The desalination facility 102 desalinates the saline water (e.g., by removing or otherwise reducing a salt content and/or other mineral content of the saline water), and directs the desalinated water into the aquifer 104 through the conduit 106. As the desalinated water flows through the conduit 106, potential and/or kinetic energy from the flowing desalinated water is converted into electrical power by the turbine generator 108.

The electrical power can be utilized in various ways. In some implementations, at least a portion of the electrical power can be relayed to the desalination facility 102, and used to power the desalination facility 102. In some implementations, at least a portion of the electrical power can be relayed to a power storage facility 114, and stored for later use (e.g., by the desalination facility 102 or other facilities near the desalination facility 102). In some implementations, at least a portion of the electrical power can be relayed to a power distribution facility 116, which in turn relays the electrical power to one or more remote locations. In this manner, power generated by the electrical power generation system 100 can be used to power the electrical power generation system 100 itself, power one or more facilities nearby the electrical power generation system 100, and/or power one or more facilities remote from the electrical power generation system 100.

In some implementations, the electrical power generation system 100 can be powered partially or entirely by the electrical power generated by the turbine generator 108. This can be useful, for example, as it enables the electrical power generation system 100 to eliminate or reduce its consumption of electrical power from outside sources. In some implementations, the electrical power generation system 100 can be powered partially or entirely by electrical power generated by a secondary power source 118.

The desalination facility 102 includes one or more devices or systems to desalinate water. In some implementations, the desalination facility 102 can remove salt and other minerals from saline water through vacuum distillation (e.g., a process by which saline water is boiled to separate impurities from the water) and/or membrane desalination (e.g., a process by which membranes and pressure are used to separate impurities from water).

The aquifer 104 is an underground layer of water-bearing permeable rock, rock fractures, and/or unconsolidated materials (e.g., gravel, sand, or silt) from which groundwater can be extracted. In some implementations, the aquifer 104 can be a naturally occurring formation (e.g., a naturally occurring formation below the surface of the earth, with water naturally deposited in the formation).

In some implementations, desalinated water from the desalination facility 102 can be used to replenish the aquifer 104. For example, if the water content of the aquifer 104 has been depleted (e.g., due to extraction of water over a period of time), desalinated water from the desalination facility 102 can be directed into the aquifer 104 and stored there, thereby increasing the water content of the aquifer 104 and/or slowing the rate of depletion of the aquifer 104. Water stored in this manner subsequently can be extracted for use, as if it were naturally deposited in the aquifer 104. Thus, the electrical power generation system 100 enables the replenishment of a naturally occurring aquifer, such that the usable life of the aquifer is extended.

The turbine generator 108 converts potential and/or kinetic energy into electrical power. As the desalinated water flows through the conduit 106 (e.g., from a higher elevation to a lower elevation), the turbine generator 108 converts at least a portion of the potential and/or kinetic energy from the flowing desalinated water into electrical power. In some implementations, the turbine generator 108 can include one or more turbine or rotor assemblies 120 located in the path of the desalinated water flowing through the conduit 106. As the flowing water passes through the turbine generator 108, the flowing water rotates the turbine or rotor assemblies 120. This mechanical motion can be used to actuate one or more components 122 of a dynamo (e.g., a commutator) and/or an alternator (e.g., a magnet or an armature) to produce electrical current.

In some implementations, the turbine generator 108 can include one or more pumps to pump water towards the aquifer 104 and/or away from the aquifer 104 (e.g., towards the desalination facility 102). As an example, in some implementations, the turbine generator 108 can be a pump-turbine or a pump-as-turbine. This can be beneficial, for example, as a pre-existing installation already may have one or more pumps located in conduits extending from the surface of the earth to the aquifer 104. Thus, the turbine generator 108 can be implemented using some or all of those same pumps and conduits, thereby reducing the cost of implementing the electrical power generation system 100. Further, as described with respect to FIG. 1B, a pump-turbine or pump-as-turbine can extract water from the aquifer for use at the earth's surface.

As described herein, electrical power generated by the turbine generator 108 can be utilized in various ways. In some implementations, at least a portion of the generated electrical power can be relayed to the desalination facility 102, and used to power the desalination facility 102. For example, the turbine generator 108 can be in electrical communication with the desalination facility 102 via an electrical conductor (e.g., one or more wires), such that electrical power generated by the turbine generated 108 can be relayed directed to the desalination facility 102 for use.

In some implementations, at least a portion of the generated electrical power can be relayed to a power storage facility 114, and stored for later use (e.g., by the desalination facility 102 or other facilities). The power storage facility 114 can include, for example, one or more mechanical power storage devices (e.g., compressed air power storages devices, hydraulic accumulators, etc.), electrical power storage devices (e.g., capacitors), biological power storage devices (e.g., glycogen storage devices), electrochemical power storage devices (e.g., batteries or super capacitors), thermal power storage devices (e.g., molten salt power storage devices or steam accumulators), and/or chemical power storage devices (e.g., hydrogen power storage devices or gas power storage devices) to store electrical power.

In some implementations, at least a portion of the generated electrical power can be relayed to a power distribution facility 116, which in turn relays the electrical power to one or more remote locations. The power distribution facility 116 can include, for example, one or more electrical transformers to convert electrical power to a suitable current and voltage for transmission, and/or one or more electrical transmission lines to relay the electrical power to a remote entity. In some implementations, the power distribution facility 116 can be interconnected with a general power grid (e.g., a municipal or regional power grid) to supply electrical power to one or more consumers (e.g., households, businesses, etc.) across a particular area.

The secondary power source 118 provides electrical power to the desalination facility 102 to support the operation of the desalination facility 102. In some implementations, the secondary power source 118 can provide electrical power generated using one or more alternative sources of power. For example, the secondary power source 118 can include one or more solar powered electric generators, wind powered electric generators, hydroelectric generators, and/or steam generators. This can be useful, for example, as it enables the electrical power generation system 100 to operate in a more environmentally conscious manner. In some case, the secondary power source 118 can generate electrical power using other sources of power, such as gasoline, oil, coal, nuclear fission, and so forth. In some implementations, electrical power from the secondary power source 118 can be used to supplement the electrical power generated by the generators 108 to support the operation of the desalination facility 102. In some implementations, the electrical power generation system 100 can be powered predominantly or entirely by solar power and/or other electrical power generated by the electrical power generation system itself (e.g., such that the electrical power generation system 100 is substantially self-sustaining with respect to electrical power).

In some implementations, the desalination facility 102 can draw saline water from a naturally occurring source of saline water 110. As an example, the desalination facility 102 can draw saline water from a neighboring body of water such as an ocean or a bay (e.g., a naturally occurring source of saline water). In some implementations, the desalination facility 102 can draw saline water from an artificial source of saline water 110 (e.g., a manufactured tank or reservoir).

The conduits 106 and 112 are configured to convey fluid from one location to another. In some implementations, the conduits 106 and/or 112 can include one or more pipes, tubes, and/or channels for carrying fluid. As an example, the conduit 106 can include one or more pipes encasing one or more wellbores extending from the desalination facility 102 and to the aquifer 104. As another example, the conduit 112 can include one or more pipes or tubes extending from the desalination facility 102 to the source of saline water 110.

In the example shown in FIG. 1A, the desalination facility 102 draws saline water from the source of saline water 110, and directs desalinated water to the aquifer 104. However, in some implementations, the flow of fluid can be reversed across one or more portions of the electrical power generation system 100.

Figure 1B:
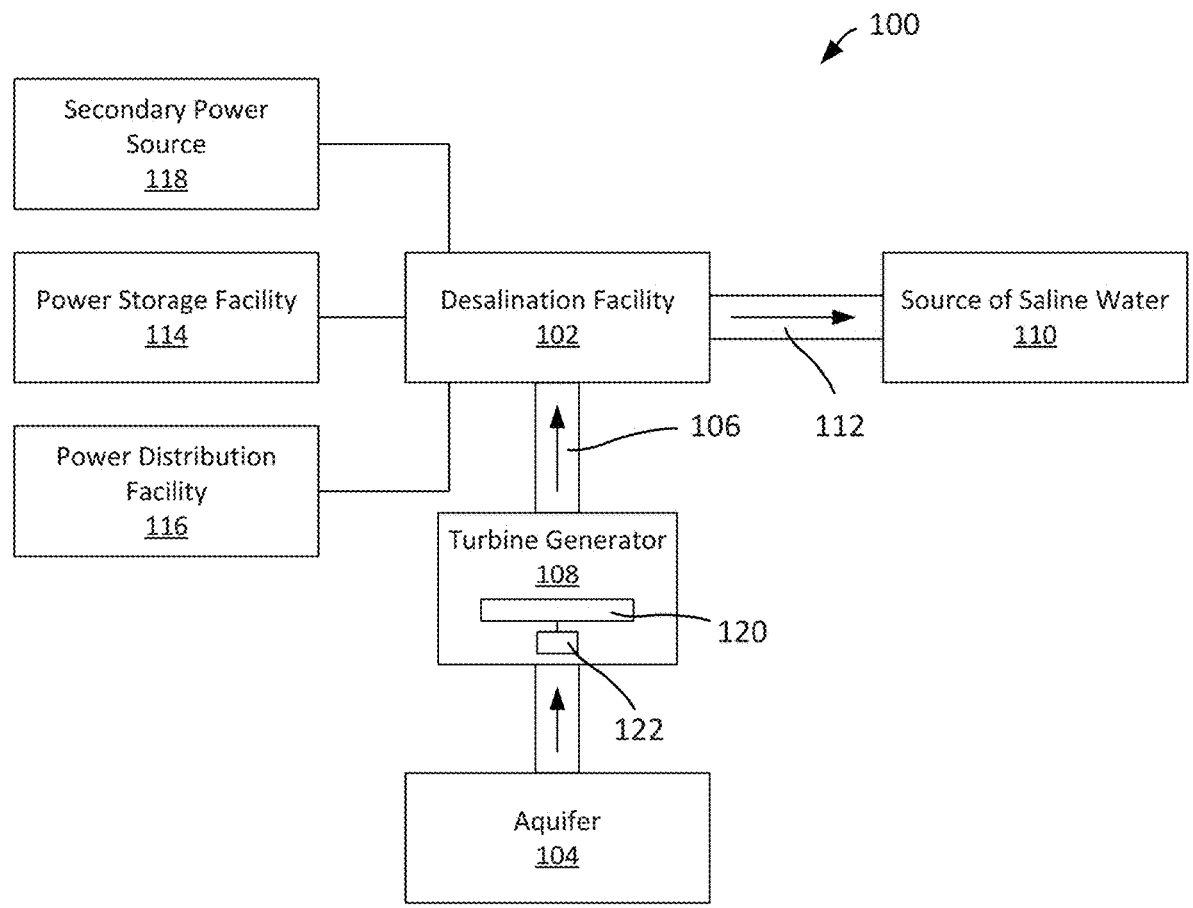

For example, as shown in FIG. 1B, the desalination facility 102 can draw water from the aquifer 104. This can be useful, for example, in extracting water from the aquifer 104 for use (e.g., for human consumption, agriculture, or other applications). In some implementations, water can be drawn from the aquifer 104 through one or more pumps located in the conduit 106. In some implementations, the turbine generator 108 can include one or more pumps (e.g., a pump-turbine generator, or a pump-as-turbine) to pump water towards the desalination facility 102 (e.g., for use as potable water for human consumption, irrigation water in support of agriculture, or other purposes).

As another example, as shown in FIG. 1B, the desalination facility 102 can expel water back into the source of saline water 110. This can be useful, for example, in expelling waste water from the desalination process (e.g., water containing salt and/or other minerals extracted from the desalinated water).

Although FIG. 1B shows water flowing across the same conduits 106 and 112 shown in FIG. 1A, this need not be the case. In some implementations, the system 100 can include one or more additional conduits 106 and/or 112, and each conduit can be configured to transfer water in either direction selectively, or transfer water only in a single dedicated direction.

Figure 2:
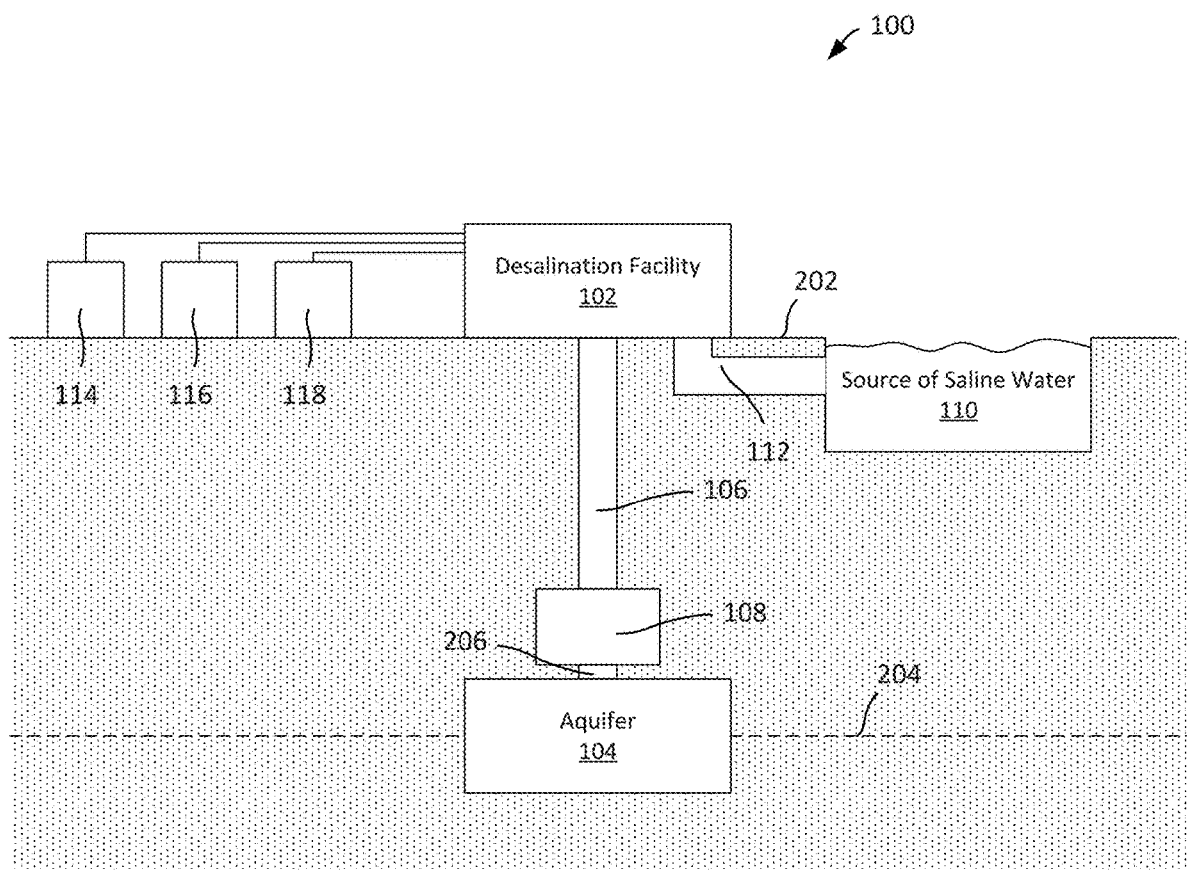
FIG. 2 is a diagram of an example arrangement of an electrical power generation system.

In some implementations, the components of the electrical power generation system 100 can be disposed at different elevations relative to one another to facilitate generation of electrical power. For instance, FIG. 2 shows an example arrangement of the electrical power generation system 100. In this example, the desalination facility 102 is located on or near the earth's surface 202, and the aquifer 104 is located beneath the earth's surface 202 at a subterranean elevation 204. As the desalination facility 102 is at a higher elevation than the aquifer 104, desalinated water from the desalination facility 102 can flow to the aquifer 104 substantially under the influence of gravity. For example, once desalinated water has been directed to the conduit 106, the water can flow down the conduit 106 and through the turbine generator 108 under the influence of gravity and without the aid of pumps. This can be useful, for example, as it reduces the amount of power required to transfer desalinated water from the desalination facility 102 to the aquifer 104. Further, as water flows through the turbine generator 108 without the aid of pumps, the turbine generator 108 can produce electrical power more efficiently.

In some implementations, the turbine generator 108 can be disposed on or near the bottom end 206 of the conduit 106. This can be useful, for example, as it enables the desalinated water to acquire a relatively large amount of kinetic energy (e.g., due to its descent down the conduit 106), which may increase the amount of electrical power that can be generated by the turbine generator 108.

Further, water can be extracted from the aquifer 104 by pumping water from the aquifer 104 to a higher elevation (e.g., from the subterranean elevation 204 to the earth's surface 202). As described herein, this can be performed by the turbine generator 108 (e.g., a pump-turbine generator) and/or separate pumps located along the conduit 106 and/or one or more other conduits extending from the aquifer 104 to the earth's surface 202.

In the example shown in FIG. 2, the source of saline water 110 is located on the earth's surface 202 (e.g., a body of water exposed along the earth's surface, such as an ocean or bay), and water is extracted from the source of saline water 110 by an underground conduit 112. In some implementations, however, the source of saline water 110 can be an underground body of water (e.g., an underground reservoir of saline water beneath the earth's surface). Further, in some implementations, part of or the entirety of the conduit 112 can above the earth's surface 202 (e.g., a pipe or tube extending along the earth's surface).

Further, in the example shown in FIG. 2, each of the power storage facility 114, and power distribution facility 116, and the secondary power source 118 is located on the earth's surface 202. However, in practice, one or more of these components can be located at different locations (e.g., beneath the earth's surface 202).

Although configurations of the electrical power generation system 100 are shown in FIGS. 1A, 1B, and 2, these are merely illustrative examples. In practice, the electrical power generation system 100 can have different arrangements of components, depending on the implementation. Further, in practice, the electrical power generation system 100 can include more than one of some or all of the described components. In some cases, one or more of the described components may be omitted.

For example, although a single conduit 106 and a single conduit 112 are shown in FIGS. 1A, 1B, and 2, in practice, there can be any number of conduits extending between each of the components of the system 100. Further, although the conduits 106 and 112 are shown as channels having a single entrance aperture and a single exit aperture (e.g., a single channeled tube or pipe), other configurations are also possible.

As another example, although a single turbine generator 108 is shown in FIGS. 1A, 1B, and 2, in practice, there may be any number of turbine generators 108 to generate electrical power from flowing desalinated water.

Figure 3:
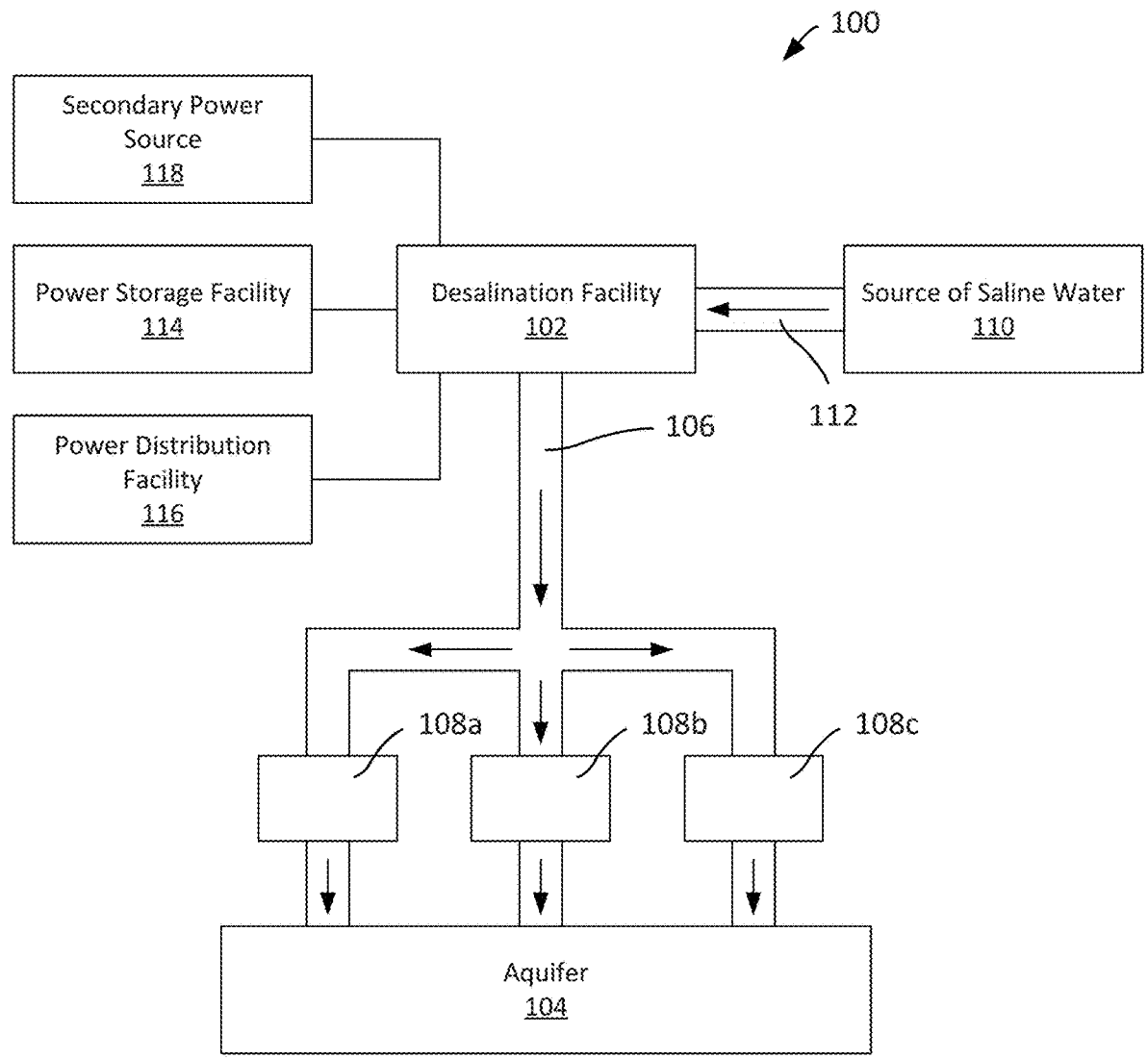
FIG. 3 is a diagram of another example of an electrical power generation system.

For instance, FIG. 3 shows another example electrical power generation system 100. In general, each of the components shown in FIG. 3 can operate in a similar manner as those shown in FIG. 1. As an example, the desalination facility 102 can draw water from a source of saline water 110, and direct desalinated water into the aquifer 104, thereby replenishing the aquifer 104. Further, the system 100 can generate electrical power from the flowing desalinated water, and either use the generated electrical power to power the electrical power generation system 100 itself, power one or more facilities nearby the electrical power generation system 100, and/or power one or more facilities remote from the electrical power generation system 100.

However, in this example, the conduit 106 extends through multiple turbine generators 108a-108c (e.g., through a branching, multi-channeled configuration). This enables the use of multiple turbine generators 108a-108c simultaneously. This can be beneficial, for example, as it spreads the flow of desalinated water across multiple turbine generators 108a-108c, such that the mechanical load across each of the turbine generators 108a-108c is reduced. Further, this enables the electrical power generation system 100 to generate electrical power more reliably (e.g., the electrical power generation system 100 can still generate electrical power, even if some of the turbine generators 108a-108c are damaged or disabled). In some implementations, water can be directed selectively to particular turbine generators 108a-108c (e.g., through the use to valves located along the conduit 106). This can be useful, for example, as it enables one or more of the turbine generators 108a-108c to be serviced without interrupting the flow of desalinated water into the aquifer 104 and without interrupting the generation of electrical power.

Figure 4:
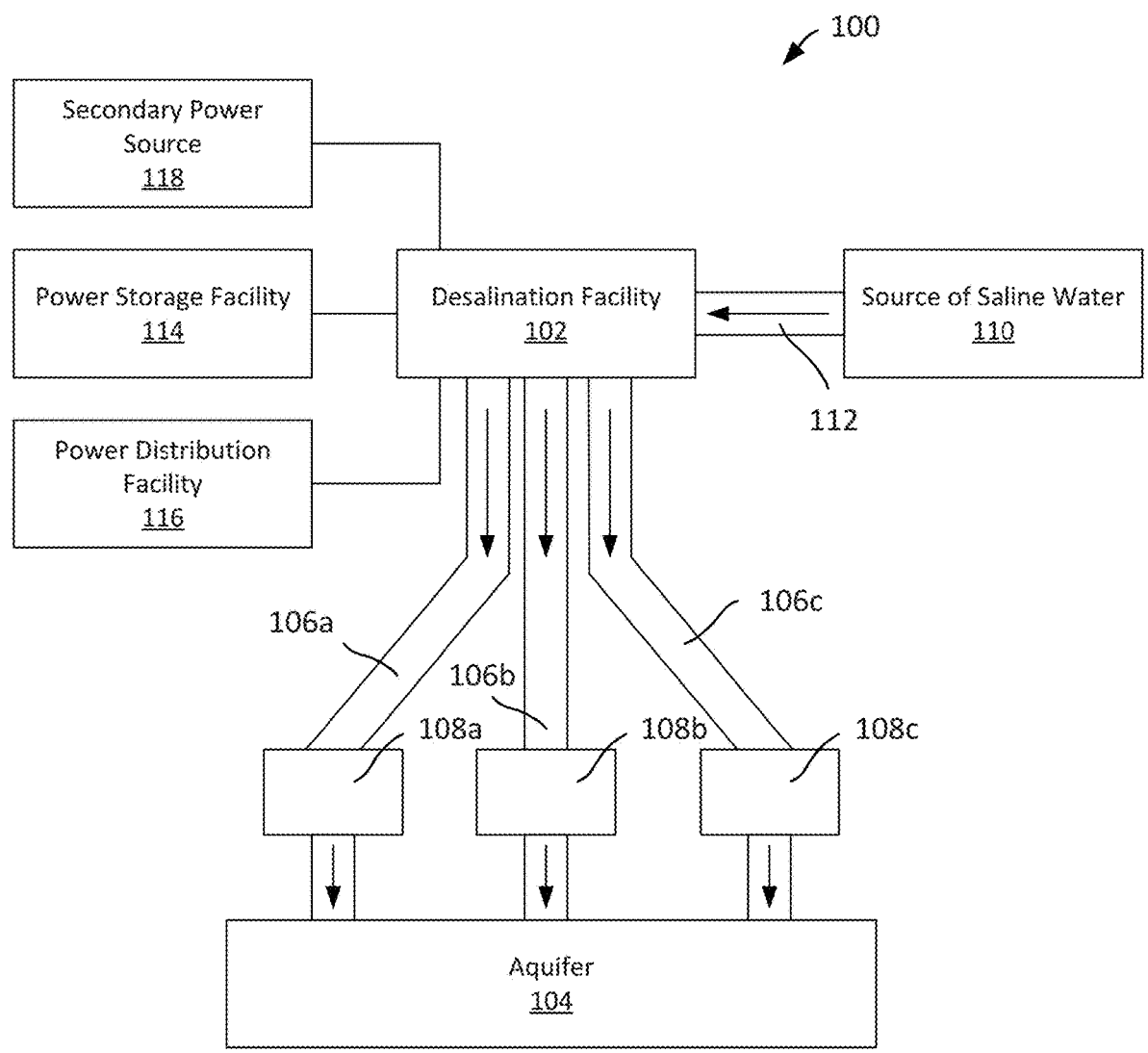
FIG. 4 is a diagram of another example of an electrical power generation system.

Another example electrical power generation system 100 is shown in FIG. 4. In general, each of the components shown in FIG. 4 can operate in a similar manner as those shown in FIG. 1. As an example, the desalination facility 102 can draw water from a source of saline water 110, and direct desalinated water into the aquifer 104, thereby replenishing the aquifer 104. Further, the system 100 can generate electrical power from the flowing desalinated water, and either use the generated electrical power to power the electrical power generation system 100 itself, power one or more facilities nearby the electrical power generation system 100, and/or power one or more facilities remote from the electrical power generation system 100.

However, in this example, the electrical power generation system 100 includes multiple conduits 106a-106c that extend through multiple turbine generators 108a-108c. This enables the use of multiple turbine generators 108a-108c simultaneously. As with the configuration shown in FIG. 3, this can be beneficial as it spreads the flow of desalinated water across multiple turbine generators 108a-108c, such that the mechanical load across each of the turbine generators 108a-108c is reduced. Further, this feature can enable the electrical power generation system 100 to generate electrical power more reliably (e.g., the electrical power generation system 100 can still generate electrical power, even if some of the turbine generators 108a-108c are damaged or disabled). In some implementations, water can be directed selectively to particular turbine generators 108a-108c (e.g., by selectively directing water into particular conduits 106a-106c). This can be useful, for example, as it enables one or more of the turbine generators 108a-108c to be serviced without interrupting the flow of desalinated water into the aquifer 104 and without interrupting the generation of electrical power.

Figure 5:
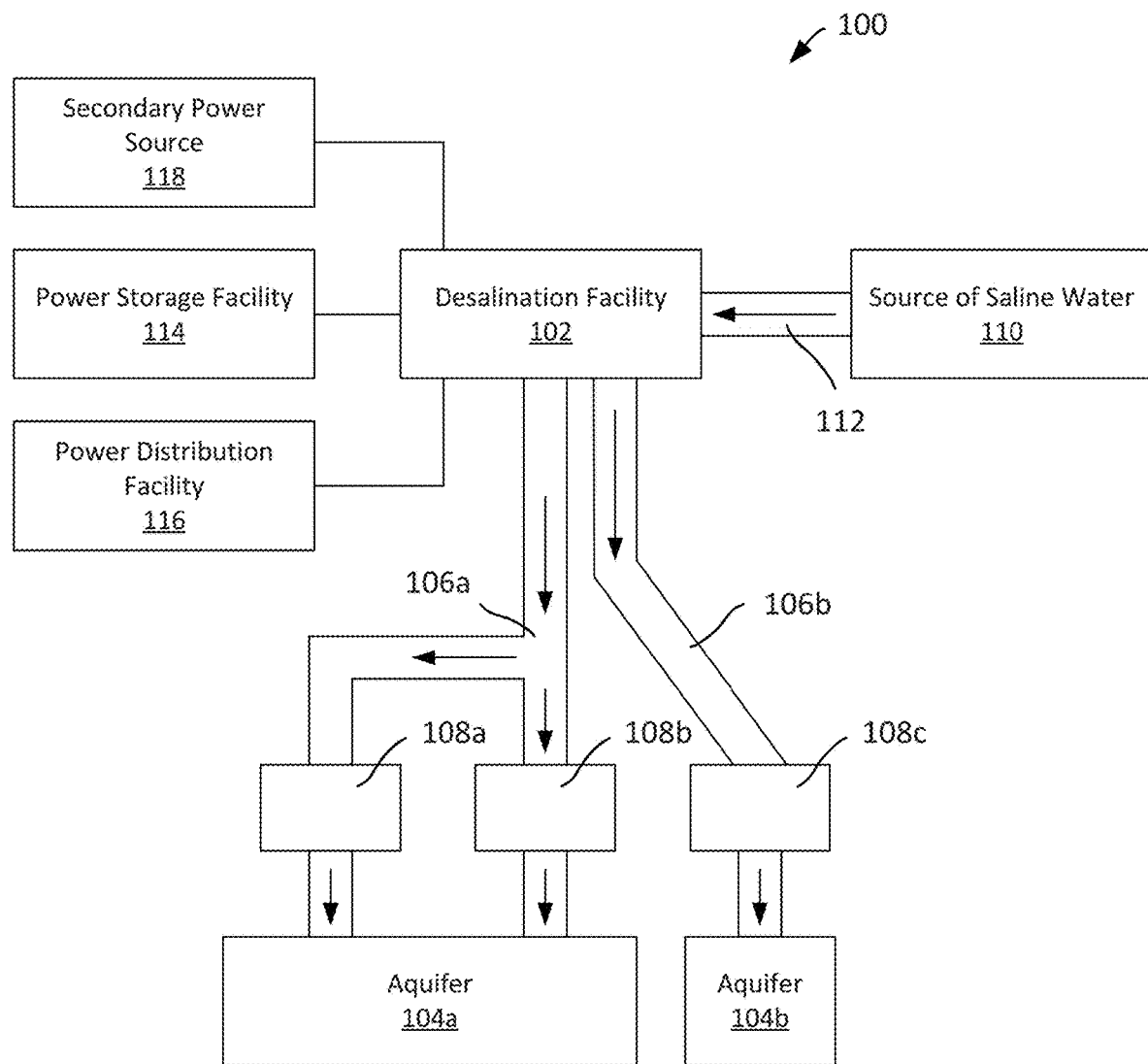
FIG. 5 is a diagram of another example of an electrical power generation system.

In some implementations, the system 100 can be used to replenish multiple aquifers. For instance, FIG. 5 shows another example electrical power generation system 100. In general, each of the components shown in FIG. 5 can operate in a similar manner as those shown in FIG. 1. As an example, the desalination facility 102 can draw water from a source of saline water 110, and direct desalinated water into an aquifer, thereby replenishing the aquifer. Further, the system 100 can generate electrical power from the flowing desalinated water, and either use the generated electrical power to power the electrical power generation system 100 itself, power one or more facilities nearby the electrical power generation system 100, and/or power one or more facilities remote from the electrical power generation system 100.

However, in this example, the electrical power generation system 100 selectively can replenish multiple aquifers 104*a* and 104*b*, either simultaneously or sequentially (e.g., one at a time). As shown in FIG. 5, the electrical power generation system 100 can include conduits 106*a* and 106*b* that each extend through one or more turbine generators 108*a*-108*c*. This enables the use of multiple turbine generators 108*a*-108*c* simultaneously. As with the configuration shown in FIG. 3, this can be beneficial as it spreads the flow of desalinated water across multiple turbine generators 108*a*-108*c*, such that the mechanical load across each of the turbine generators 108*a*-108*c* is reduced. Further, this feature can enable the electrical power generation system 100 to generate electrical power more reliably (e.g., the electrical power generation system 100 can still generate electrical power, even if some of the turbine generators 108*a*-108*c* are damaged or disabled).

In some implementations, water can be directed selectively to particular turbine generators 108*a*-108*c* (e.g., through the use to valves located along the conduit 106*a* and 106*b* and/or by selectively directing water into particular conduits 106*a* and 106*b*). This can be useful, for example, as it enables one or more of the turbine generators 108*a*-108*c* to be serviced without interrupting the flow of desalinated water into aquifers 104*a* and/or 104*b* and without interrupting the generation of electrical power.

Further, the foregoing feature can enable the electrical power generation system 100 to replenish an aquifer and/or extract water stored in an aquifer independently for each aquifer. For example, the electrical power generation system 100 can replenish both aquifers 104*a* and 104*b* concurrently (e.g., when both aquifers are depleted). As another example, the electrical power generation system 100 can replenish the aquifer 104*a* while extracting water from the aquifer 104*b* (e.g., when only the aquifer 104*a* is depleted). As another example, the electrical power generation system 100 can extract water from both aquifers 104*a* and 104*b* concurrently (e.g., when neither aquifer is depleted). In this manner, the electrical power generation system 100 can manage the water content of multiple aquifers concurrently and in a flexible manner.

As described above, in some implementations, an electrical power generation system 100 can generate electrical power selectively at specific times to meet the electrical demand on the electrical grid. For example, the electrical power generation system can generate electrical power selectively during times of high or peak demand, while not generating power during times of low demand. As another example, the electrical power generation system can generate electrical power selectively during times of low supply (e.g., when the supply of power is unable to meet the demand, or is at least of being unable to meet the demand). This can be useful, for example, as it enables the electrical grid to provide electrical power reliably to each of its users, despite fluctuations in demand over time. This also can be useful, for example, as it enables electrical power to be generated and delivered more efficiently (e.g., by reducing the storage of excess electrical power during times of low demand, which may be electrically inefficient due to power losses during the storage process).

In some implementations, an electrical power generation system 100 can generate electrical power selectively to mitigate the effects of a temporal displacement between supply and demand due to an electrical grid's reliance on solar power. For example, an electrical grid's supply of solar power typically peaks during times of intense sunlight (e.g., during the afternoon). However, demand of electrical power often peaks during a different time of day when the supply of solar power has diminished (e.g., during the early evening). The electrical power generation system 100 can generate electrical power selectively (e.g., when the supply of solar power is diminished) to supplement the electrical grid's supply.

Figure 6:
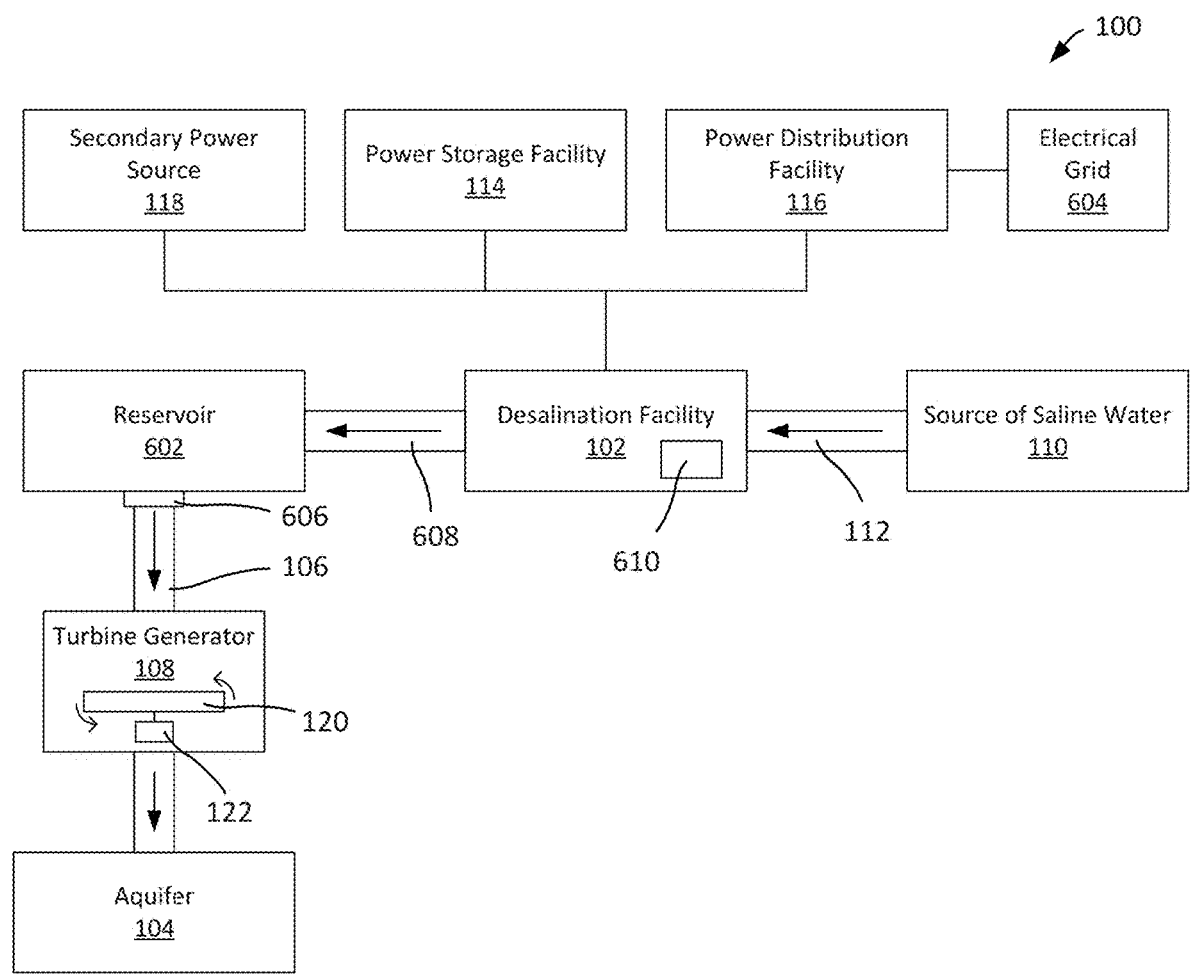
FIG. 6 is a diagram of another example of an electrical power generation system.

An example electrical power generation system 100 for selectively generating electrical power is shown schematically in FIG. 6. In general, the electrical power generation system 100 can be similar to the electrical power generation system shown in FIGS. 1, 2, 3, 4, and/or 5. For example, the electrical power generation system 100 shown in FIG. 6 includes a desalination facility 102, an aquifer 104, a turbine generator 108, a power storage facility 114, an energy distribution facility 116, and a secondary power source 118, each of which can be similar to those described with respect to FIGS. 1, 2, 3, 4, and/or 5.

In a similar manner as described with respect to FIG. 1, during operation of the electrical power generation system 100, the desalination facility 102 draws saline water from a source of saline water 110 (e.g., via a conduit 112 extending between them). The desalination facility 102 desalinates the saline water (e.g., by removing or otherwise reducing a salt content and/or other mineral content of the saline water).

However, in this example, the desalination facility 102 directs the desalinated water to a reservoir 602 (e.g., via a conduit 608). The reservoir 602 temporarily stores the desalinated water, prior to the desalinated water being used to replenish the aquifer 104. In some implementations, the reservoir 602 can be artificial vessel (e.g., a manufactured tank). In some implementations, the reservoir 602 can be an artificially created reservoir (e.g., an artificially created lake or pond, such as through a dam). In some implementations, the reservoir 602 can be a naturally occurring reservoir (e.g., a naturally occurring lake or pond).

During operation, the desalination facility monitors the usage of an electrical grid 604 coupled to the power distribution facility 116. In some implementations, electrical grid 604 can be a general power grid (e.g., a municipal or regional power grid) to supply electrical power to one or more consumers (e.g., households, businesses, etc.) across a particular area.

Further, the desalination facility 102 can determine, based on the usage of the electrical grid 604, that one or more trigger criteria have been met (e.g., indicating that power is to be generated using the desalinated water in the reservoir 602). In response, the desalination facility 102 causes the desalinated water to flow from the reservoir 602, through the turbine generator 108, and into the aquifer 104 (e.g., through a conduit 106 extending between them). In some implementations, this can be performed, at least in part, by releasing water through a valve 606 in fluid communication between the reservoir 602 and the conduit 106, and allowing the water to flow through the turbine generator 108 and into the aquifer 104 predominantly or entirely under an influence of gravity.

A described herein, the turbine generator 108 converts potential and/or kinetic energy into electrical power. As the desalinated water flows through the conduit 106 (e.g., from a higher elevation to a lower elevation), the turbine generator 108 converts at least a portion of the potential and/or kinetic energy from the flowing desalinated water into electrical power. In some implementations, the turbine generator 108 can include one or more turbine or rotor assemblies 120 located in the path of the desalinated water flowing through the conduit 106. As the flowing water passes through the turbine generator 108, the flowing water rotates the turbine or rotor assemblies 120. This mechanical motion can be used to actuate one or more components 122 of a dynamo (e.g., a commutator) and/or an alternator (e.g., a magnet or an armature) to produce electrical current.

At least a portion of the electrical power generated by the turbine generator 108 is provided to the power distribution facility 116. Further, at least a portion of that electrical power can be provided to the electrical grid 604 for use. In some implementations, all or substantially all of the electrical power generated by the turbine generator 108 can be provided to the power distribution facility 116 and/or the electrical grid 604. In some implementations, some of the electrical power generated by the turbine generator 108 can be used by the electrical power generation system 100 to support its operation (e.g., to power the desalination facility 102). In some implementations, some of the electrical power generated by the turbine generator 108 can be stored in the power storage facility 114 (e.g., to support future operation of electrical power generation system 100 and/or for future distribution to the electrical grid 604).

In practice, various trigger criteria can be used to determine when the electrical power generation system 100 is to generate electrical power. As an example, in some implementations, the desalination facility 102 can determine a demand for electrical power on the electrical grid 604 over a period of time (e.g., during a particular measurement interval), and determine a supply of electrical power on the electrical grid 604 over the period of time (e.g., an amount of electrical power available to meet the demand). If the demand for electrical power exceeds the supply of electrical power, the electrical power generation system 100 can direct water from the reservoir 602, through the turbine generator 108, and into the aquifer 104 to generate electrical power and to replenish the aquifer 104. The generated electrical power can be provided to the electrical grid 604 to meet the demand.

As another example, in some implementations, the desalination facility 102 can determine that the difference between the demand for electrical power on the electrical grid 604 and the supply for electrical power on the electrical grid 604 is less than a threshold level. In response, the electrical power generation system 100 can direct water from the reservoir 602, through the turbine generator 108, and into the aquifer 104 to generate electrical power and to replenish the aquifer 104. The generated electrical power can be provided to the electrical grid 604 for distribution. This can be useful, for example, as it enables the electrical power generation system 100 to provide extra electrical power to the electrical grid 604 when demand is nearing the supply level (e.g., to reduce the risk of demand exceeding supply due to a subsequent spike in demand and/or a reduction in supply).

For instance, the threshold level can be 10 units of power. When the demand for electrical power is 100 units and the supply for electrical power is 120 units, the electrical power generation system 100 can refrain from directing water from the reservoir 602, through the turbine generator 108, and into the aquifer 104 (e.g., by closing the valve 606). However, when the demand for electrical power is 115 units and the supply for electrical power is 120 units, the electrical power generation system 100 can direct water from the reservoir 602, through the turbine generator 108, and into the aquifer 104 to generate electrical power (e.g., by opening the valve 606) and to replenish the aquifer 104.

In some implementations, the threshold level can be selected empirically (e.g., selected by an operator of the electrical power generation system 100 based on experiment or tests). In some implementations, the threshold level can be an absolute value (e.g., expressed in absolute units of power). In some implementations, the threshold level can be a relative value (e.g., expressly as a particular percentage of the demand of electrical power or the supply of electrical power).

As another example, in some implementations, the desalination facility 102 can estimate a future demand for electrical power and/or a future supply of electrical power on the electrical grid 604 (e.g., based on historical information regarding usage of the electrical grid 604). Based on this information, the electrical power generation system 100 can generate electrical power selectively at certain times, while refraining from generating electrical power selectively at other times. This can be beneficial, for example, as it enables the electrical power generation system 100 to provide power preemptively to the electrical grid 604 (e.g., in anticipation of the demand out-stripping the supply of the electrical grid 604, or an anticipation of the demand approaching the available supply of the electrical grid 604).

For instance, the desalination facility 102 can determine, based on historical usage information regarding the electrical grid 604, that demand for electrical power typically exceeds supply electrical power during certain times of the day and/or that the demand of electrical power peaks during those times of day. Based on this information, the electrical power generation system 100 can generate electrical power selectively at or prior to those times of day, such that the electrical grid 604 can meet the anticipated demand.

As another example, in some implementations, the desalination facility 102 can monitor a supply of electrical power to the electrical grid 604 from one or more solar power generators (e.g., solar panels). If the supply of electrical power from the one or more solar power generators decreases below a threshold level, in response, the electrical power generation system 100 can direct water from the reservoir 602, through the turbine generator 108, and into the aquifer 104 to generate electrical power and to replenish the aquifer 104. The generated electrical power can be provided to the electrical grid 604 for distribution. This can be useful, for example, in mitigating the effects of a temporal displacement between supply and demand due to the electrical grid's reliance on solar power. In some implementations, the threshold level can be determined empirically (e.g., selected by an operator of the electrical power generation system 100 based on experiment or tests).

In some implementations, the electrical power generation system 100 can store desalinated water temporarily in the reservoir 602. If the desalination facility 102 determines that electrical power need not be generated during a certain period of time (e.g., an expiration interval of time elapses without any of the trigger criteria being met), the desalination facility 102 can direct the desalinated water from the reservoir 602 to the aquifer 104 (e.g., through the turbine generator 108, or bypassing the turbine generator 108). This can be useful, for example, as it enables the electrical power generation system 100 to refrain from generating electrical power temporality (e.g., in case the electrical 604 could benefit from additional electrical power), but to continue replenishing the aquifer 104 if there is no need for additional electrical power over a certain period of time. In some implementations, the interval of time can be selected empirically (e.g., selected by an operator of the electrical power generation system 100 based on experiment or tests).

In some implementations, the desalination facility 102 can be powered partially or entirely by solar power. For example, the secondary power source 118 can include one or more solar panels configured to generate solar power. The generated solar power can be provided to the desalination facility 102 to support its operation.

In some implementations, at least a portion of the techniques described herein can be performed using one or more computer systems. As an example, the desalination facility 102 can include a control module 610 implemented using one or more computer systems. The control module 610 can monitor the usage of the electrical grid 604. Based on the monitoring, the control module 610 can control an operation of one or more of the components described herein (e.g., by transmitting one or more command signals to the one or more components to perform the techniques described herein). In some implementations, one or more of the techniques described herein can be performed automatically (e.g., without human intervention). Although FIG. 6 shows the control module 610 as sub-component of the desalination facility 102, in practice, the control module 610 can be implemented as a sub-component of any of the other components of the electrical power generation system 100. Further, in some implementations, the control module 610 can be implemented as an individual component of the electrical power generation system 100. Further still, although FIG. 6 shows the control module 610 as single component, in practice, the control module t610 can be implemented as multiple components.

Figure 7:
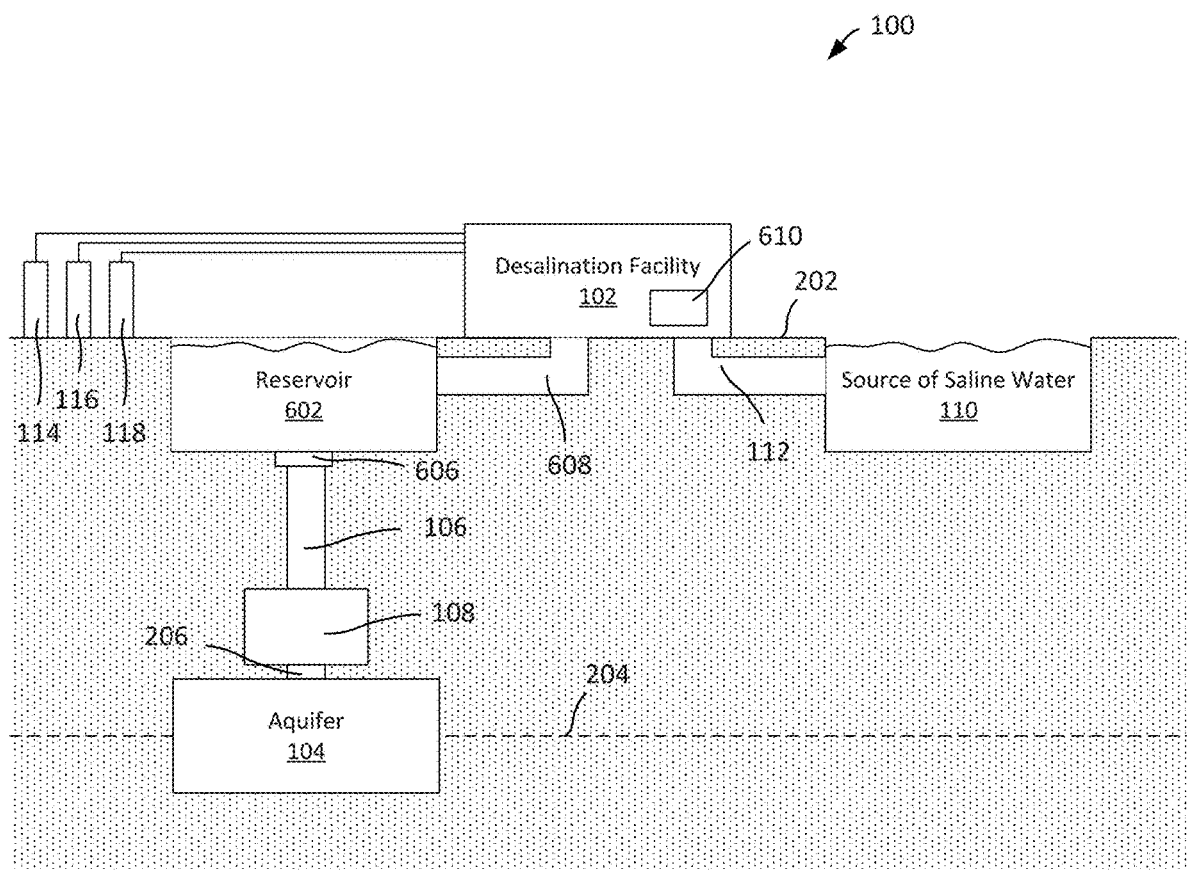
FIG. 7 is a diagram of an example arrangement of an electrical power generation system.

FIG. 7 shows an example arrangement of the electrical power generation system 100 shown in FIG. 6. In this example, the reservoir 602 is located on or near the earth's surface 202, and the aquifer 104 is located beneath the earth's surface 202 at a subterranean elevation 204. As the reservoir 602 is at a higher elevation than the aquifer 104, desalinated water from the reservoir 602 can flow to the aquifer 104 substantially under the influence of gravity. For example, once desalinated water has been directed to the conduit 106, the water can flow down the conduit 106 and through the turbine generator 108 under the influence of gravity and without the aid of pumps. This can be useful, for example, as it reduces the amount of power required to transfer desalinated water from the reservoir 602 to the aquifer 104. Further, as water flows through the turbine generator 108 without the aid of pumps, the turbine generator 108 can produce electrical power more efficiently.

In some implementations, the desalination facility 102 can be located at the same elevation as the reservoir 602 (e.g., on or near the earth's surface 202). In some implementations, the desalination facility 102 can be located at a different elevation from the reservoir 602 (e.g., beneath the earth's surface 202 or above the earth's surface 202).

In a similar manner described with respect to FIG. 2, in some implementations, the turbine generator 108 can be disposed on or near the bottom end 206 of the conduit 106. This can be useful, for example, as it enables the desalinated water to acquire a relatively large amount of kinetic energy (e.g., due to its descent down the conduit 106), which may increase the amount of electrical power that can be generated by the turbine generator 108.

Further, water can be extracted from the aquifer 104 by pumping water from the aquifer 104 to a higher elevation (e.g., from the subterranean elevation 204 to the earth's surface 202). As described herein, this can be performed by the turbine generator 108 (e.g., a pump-turbine generator) and/or separate pumps located along the conduit 106 and/or one or more other conduits extending from the aquifer 104 to the earth's surface 202.

In a manner similar to that described with respect to FIG. 2, the source of saline water 110 is located on the earth's surface 202 (e.g., a body of water exposed along the earth's surface, such as an ocean or bay), and water is extracted from the source of saline water 110 by an underground conduit 112. In some implementations, however, the source of saline water 110 can be an underground body of water (e.g., an underground reservoir of saline water beneath the earth's surface). Further, in some implementations, part or the entirety of the conduit 112 can be above the earth's surface 202 (e.g., a pipe or tube extending along the earth's surface).

Similarly, in this example, the reservoir 602 is located on the earth's surface 202, and water is directed from the desalination facility 102 by an underground conduit 608. In some implementations, however, the reservoir 602 can be an underground structure (e.g., an underground reservoir beneath the earth's surface). Further, in some implementations, part of or the entirety of the conduit 608 can be above the earth's surface 202 (e.g., a pipe or tube extending along the earth's surface). Further, in some implementations, the reservoir 602 can be an above-ground structure (e.g., a reservoir above the earth's surface).

Further, in the example shown in FIG. 5, each of the power storage facility 114, and power distribution facility 116, and the secondary power source 118 is located on the earth's surface 202. However, in practice, one or more of these components can be located at different locations (e.g., beneath the earth's surface 202).

In practice, other configurations for the electrical power generation system 100 also are possible, depending on the implementation.

Example Process

Figure 8:
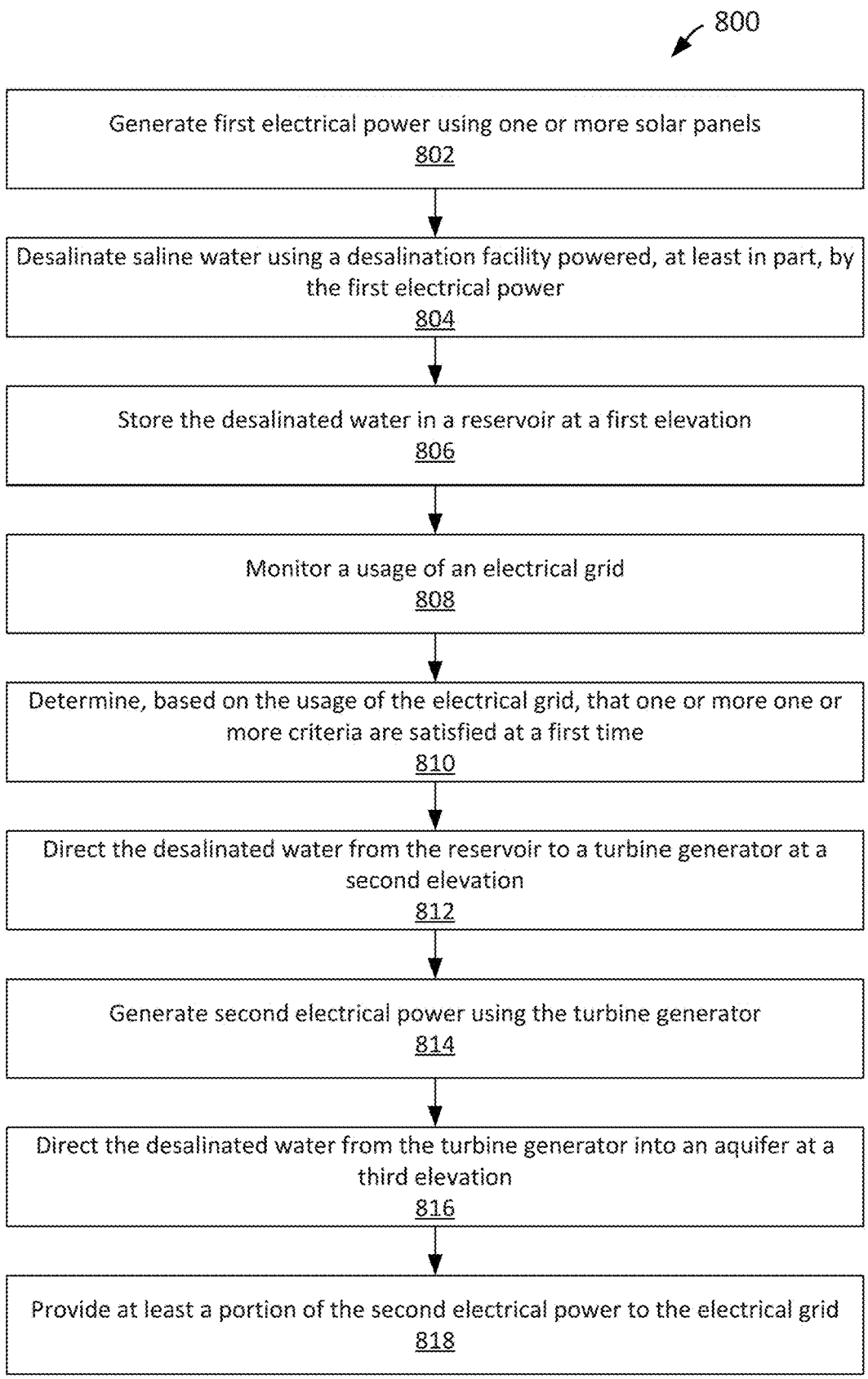
FIG. 8 is a flow chart diagram of an example process for generating electrical power.

FIG. 8 shows an example process 800 for selectively replenishing aquifers and generating electrical power based on an electrical demand on an electrical grid. The process 800 can be performed, for example, using the electrical power generation system 100 shown in FIGS. 6 and 7.

According to the process 800, first electrical power is generated using one or more solar panels (step 802). As an example, referring to FIGS. 6 and 7, the secondary power source 118 can include one or more solar panels to generate the first electrical power.

Saline water is desalinated using a desalination facility powered, at least in part, by the first electrical power (step 804). As an example, referring to FIGS. 6 and 7, the desalination facility 102 receives saline water from the source of saline water 110, and desalinates the saline water using the solar power generated by one or more solar panels of the secondary power source 118. 8. In some implementations, the desalination facility can be powered predominantly by the first electrical power.

The desalinated water is stored in a reservoir at a first elevation (step 806). As an example, referring to FIGS. 6 and 7, desalinated water can be directed from the desalination facility 102 to the reservoir 602 through a conduit 608.

A usage of an electrical grid is monitored (step 808). In some implementations, monitoring the usage of the electrical grid can include determining a demand for electrical power on the electrical grid over a period of time (e.g., a measurement interval), and determining a supply of electrical power on the electrical grid over the period of time.

A determination is made, based on the usage of the electrical grid, that one or more criteria are satisfied at a first time (step 810). The one or more criteria can be, for example, one or more trigger criteria indicating that power is to be generated using the desalinated water in the reservoir.

In some implementations, determining that the one or more criteria are satisfied at the first time can include determining that the demand for electrical power on the electrical grid exceeds the supply of electrical power on the electrical grid at the first time.

In some implementations, determining that the one or more criteria are satisfied at the first time can include determining that a difference between the demand for electrical power on the electrical grid and the supply of electrical power on the electrical grid is less than a threshold level at the first time.

In some implementations, determining that the one or more criteria are satisfied at the first time can include estimating, based on historical data regarding the usage of the electrical grid that a peak demand on the electrical grid occurs at the first time.

In some implementations, determining that the one or more criteria are satisfied at the first time can include determining that that the demand for electrical power on the electrical grid did not exceed the supply of electrical power on the electrical grid during a time interval ending at the first time (e.g., an expiration interval of time), and determining that the time interval exceeds a threshold length of time.

In some implementations, determining that the one or more criteria are satisfied at the first time can include determining that that a supply of electrical power from one or more solar power generators (e.g., solar panels) has decreased below a threshold level at the first time. In some implementations, the threshold level can be determined empirically.

Responsive to determining that the one or more criteria are satisfied at the first time, several actions are performed. These actions can include directing the desalinated water from the reservoir to a turbine generator at a second elevation (step 812), where the second elevation is lower than the first elevation. As an example, referring to FIGS. 6 and 7, desalinated water from the reservoir 602 can be directed to the turbine generator 108 through a conduit 106.

The actions also can include generating second electrical power using the turbine generator (step 814). As an example, referring to FIGS. 6 and 7, the turbine generator 108 can generate electrical power by converting potential energy and/or kinetic energy of the desalinated water into electrical power.

The actions also can include directing the desalinated water from the turbine generator into an aquifer at a third elevation (step 819), where the third elevation is lower than the second elevation. As an example, referring to FIGS. 6 and 7, desalinated water can be directed from the turbine generator 108 into the aquifer 104 through the conduit 106 so as to at least partially replenish the aquifer.

The actions also can include providing at least a portion of the second electrical power to the electrical grid (step 818). As an example, referring to FIGS. 6 and 7, at least some of the electrical power generated by the turbine generator 108 can be provided to the electrical grid 604 through the power distribution facility 116.

In some implementations, directing the desalinated water from the reservoir, to the turbine generator, and into the aquifer can include causing the desalinated water to flow from the reservoir, to the turbine generator, and into the aquifer predominantly under an influence of gravity. As an example, referring to FIGS. 6 and 7, desalinated water can be directed from the reservoir, to the turbine generator 108, into the aquifer 104 by opening the valve 606. The desalinated water can flow through the opened valve 606, through the conduit 106, and into the aquifer 104 predominantly under an influence of gravity.

In some implementations, the desalination facility can be located at the first elevation (e.g., at the same elevation as the reservoir). In some implementations, the first elevation can be a surface of the earth.

In some implementations, the process 800 further can include determining that the aquifer is at least partially depleted. The desalinated water can be directed from the reservoir to the turbine generator, after a determination is made that the aquifer is at least partially depleted.

Example Computer System

Some implementations of the subject matter and operations described in this disclosure can be implemented in digital electronic circuitry, or in computer software, firmware, or hardware, including the structures disclosed in this specification and their structural equivalents, or in combinations of one or more of them. For example, in some implementations, the control module 610 can be implemented using digital electronic circuitry, or in computer software, firmware, or hardware, or in combinations of one or more of them. In another example, the process 800 can be implemented, at least in part, using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 9:
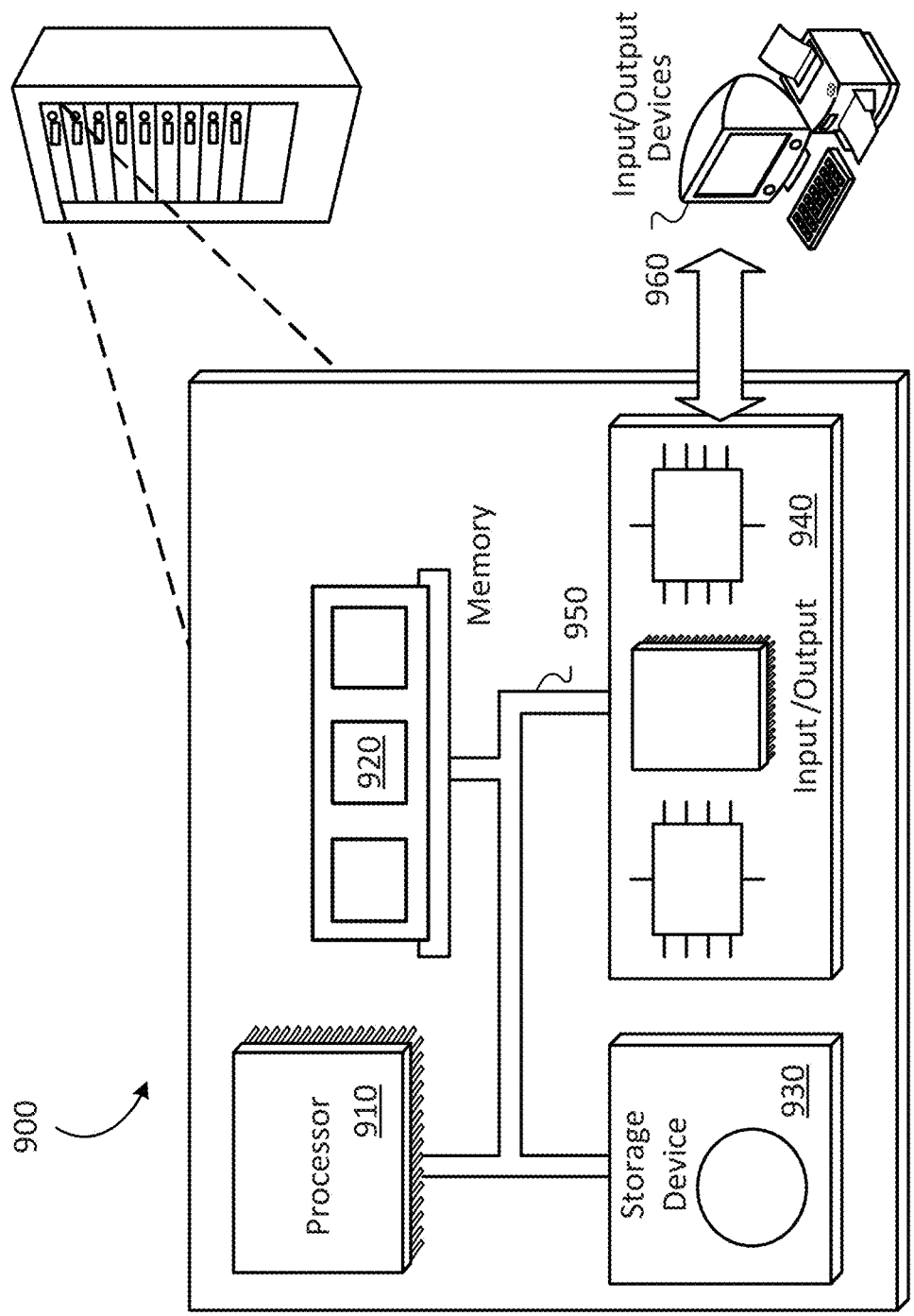
FIG. 9 is a diagram of an example of a computer system.

FIG. 9 shows an example computer system 900 that includes a processor 910, a memory 920, a storage device 930 and an input/output device 940. Each of the components 910, 920, 930 and 940 can be interconnected, for example, by a system bus 950. The processor 910 is capable of processing instructions for execution within the system 900. In some implementations, the processor 910 is a single-threaded processor, a multi-threaded processor, or another type of processor. The processor 910 is capable of processing instructions stored in the memory 920 or on the storage device 930. The memory 920 and the storage device 930 can store information within the system 900.

The input/output device 940 provides input/output operations for the system 900. In some implementations, the input/output device 940 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 960. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of implementations have been described. Nevertheless, various modifications may be made without departing from the spirit and scope of the invention. Accordingly, other implementations are within the scope of the claims.

What is claimed is:

1. A method comprising:
   generating first electrical power using one or more solar panels;
   desalinating saline water using a desalination facility powered, at least in part, by the first electrical power;
   storing the desalinated water in a reservoir located at a first elevation;
   monitoring a usage of an electrical grid;
   determining, based on the usage of the electrical grid, that one or more criteria are satisfied at a first time; and
   responsive to determining that the one or more criteria are satisfied at the first time:

directing the desalinated water from the reservoir to a turbine generator located at a second elevation, wherein the second elevation is lower than the first elevation, generating second electrical power using the turbine generator based, at least in part, on the desalinated water flowing through the turbine generator, directing the desalinated water from the turbine generator into an aquifer located at a third elevation, wherein the third elevation is lower than the second elevation, and providing at least a portion of the second electrical power to the electrical grid, wherein directing the desalinated water from the reservoir, to the turbine generator, and into the aquifer comprises causing the desalinated water to flow from the reservoir, to the turbine generator, and into the aquifer without an aid of a pump.

2. The method of claim 1, wherein monitoring the usage of the electrical grid comprises:

determining a demand for electrical power on the electrical grid over a period of time; and determining a supply of electrical power on the electrical grid over the period of time, and wherein determining that the one or more criteria are satisfied at the first time comprises determining that the demand for electrical power on the electrical grid exceeds the supply of electrical power on the electrical grid at the first time.

3. The method of claim 1, wherein monitoring the usage of the electrical grid comprises:

determining a demand for electrical power on the electrical grid over a period of time; and determining a supply of electrical power on the electrical grid over the period of time, and wherein determining that the one or more criteria are satisfied at the first time comprises determining that a difference between the demand for electrical power on the electrical grid and the supply of electrical power on the electrical grid is less than a threshold level at the first time.

4. The method of claim 1, wherein determining that the one or more criteria are satisfied at the first time comprises:

estimating, based on historical data regarding the usage of the electrical grid, that a peak demand on the electrical grid occurs at the first time.

5. The method of claim 1, wherein monitoring the usage of the electrical grid comprises:

determining a demand for electrical power on the electrical grid over a period of time; and determining a supply of electrical power on the electrical grid over the period of time, and wherein determining that the one or more criteria are satisfied at the first time comprises:

determining that that the demand for electrical power on the electrical grid did not exceed the supply of electrical power on the electrical grid during a time interval ending at the first time, and determining that the time interval exceeds a threshold length of time.

6. The method of claim 1, wherein monitoring the usage of the electrical grid comprises determining a supply of electrical power on the electrical grid over the period of time from one or more solar power generators, and wherein determining that the one or more criteria are satisfied at the first time comprises determining that the supply of electrical power from the one or more solar power generators has decreased below a threshold level at the first time.

7. The method of claim 1, wherein the desalination facility is predominantly powered by the first electrical power.

8. The method of claim 1, wherein the desalination facility is located at the first elevation.

9. The method of claim 8, wherein the first elevation is a surface of the earth.

10. The method of claim 1, further comprising determining that the aquifer is at least partially depleted, and wherein the desalinated water is directed from the reservoir to the turbine generator, after determining that the aquifer is at least partially depleted.

11. A system comprising:

one or more solar panels;

a desalination facility;

a reservoir located at a first elevation;

a turbine generator located at a second elevation, wherein the second elevation is lower than the first elevation; and a control module having one or more processors, wherein the one or more solar panels are configured to generate first electrical power and provide the first electrical power to the desalination facility, wherein the control module is operable to:

cause saline water to be desalinated using the first electrical power;

cause the desalinated water to be directed to the reservoir;

monitor a usage of an electrical grid;

determine, based on the usage of the electrical grid, that one or more criteria are satisfied at a first time; and responsive to determining that the one or more criteria are satisfied at the first time:

cause the desalinated water to flow from the reservoir to the turbine generator, cause second electrical power to be generated using the turbine generator based, at least in part, on the desalinated water flowing through the turbine generator, cause the desalinated water to flow from the turbine generator into an aquifer at a third elevation, wherein the third elevation is lower than the second elevation, and cause at least a portion of the second electrical power to be provided to the electrical grid, wherein the control module is operable to cause the desalinated water to flow from the reservoir, to the turbine generator, and into the aquifer without an aid of a pump.

12. The system of claim 11, wherein the control module is operable to monitor the usage of the electrical grid by:

determining a demand for electrical power on the electrical grid over a period of time; and determining a supply of electrical power on the electrical grid over the period of time.

13. The system of claim 12, wherein the control module is operable to determine that the one or more criteria are satisfied at the first time by:

determining that the demand for electrical power on the electrical grid exceeds the supply of electrical power on the electrical grid at the first time.

14. The system of claim 12, wherein the control module is operable to determine that the one or more criteria are satisfied at the first time by:

determining that a difference between the demand for electrical power on the electrical grid and the supply of electrical power on the electrical grid is less than a threshold level at the first time.

15. The system of claim 12, wherein the control module is operable to determine that the one or more criteria are satisfied at the first time by:
estimating, based on historical data regarding the usage of the electrical grid, that a peak demand on the electrical grid occurs at the first time.

16. The system of claim 12, wherein the control module is operable to determine that the one or more criteria are satisfied at the first time by:
determining that that the demand for electrical power on the electrical grid did not exceed the supply of electrical power on the electrical grid during a time interval ending at the first time, and
determining that the time interval exceeds a threshold length of time.

17. The system of claim 11,
wherein the control module is operable to:
determine that the aquifer is at least partially depleted, and
cause the desalinated water to flow from the reservoir to the turbine generator, after determining that the aquifer is at least partially depleted.

18. The system of claim 11, wherein the desalination facility is predominantly powered by the first electrical power.

19. The system of claim 11, wherein the desalination facility is located at the first elevation, and wherein the first elevation is a surface of the earth.

* * * * *

UNITED STATES PATENT AND TRADEMARK OFFICE
CERTIFICATE OF CORRECTION

PATENT NO. : 11,078,649 B1  
APPLICATION NO. : 16/837870  
DATED : August 3, 2021  
INVENTOR(S) : William Riley Page 1 of 1

It is certified that error appears in the above-identified patent and that said Letters Patent is hereby corrected as shown below:

In the Claims

Column 21, Line 56, In Claim 5:
Delete "that that" and insert -- that --, therefor.

Column 21, Line 67 and Column 22, Line 1, In Claim 6:
Delete "that that" and insert -- that --, therefor.

Column 23, Line 14, In Claim 16:
Delete "that that" and insert -- that --, therefor.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*